N. MITCHELL.
CARRIAGE-THILLS.

No. 177,145. Patented May 9, 1876.

WITNESSES:
John Goethals
Alex F. Roberts

INVENTOR:
N. Mitchell
BY
ATTORNEYS.

UNITED STATES PATENT OFFICE.

NELSON MITCHELL, OF ELLSWORTH FALLS, MAINE.

IMPROVEMENT IN CARRIAGE-THILLS.

Specification forming part of Letters Patent No. 177,145, dated May 9, 1876; application filed January 15, 1876.

*To all whom it may concern:*

Figure 1:
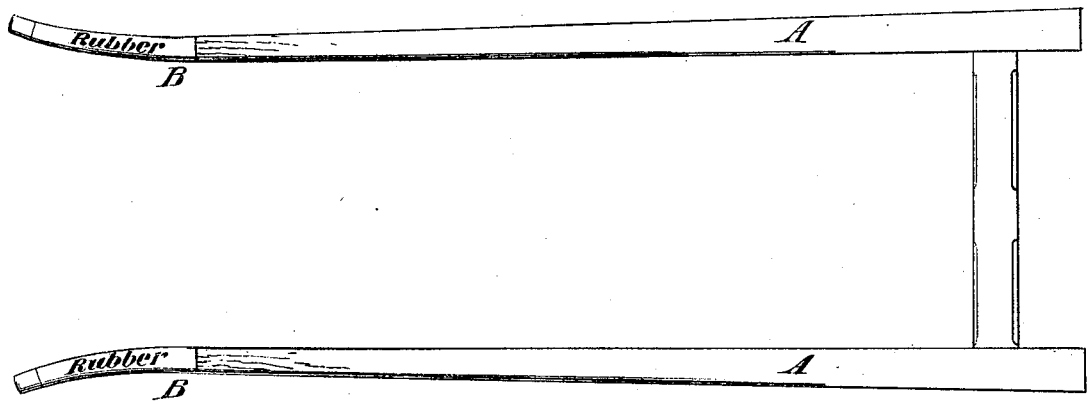
Figure 2:
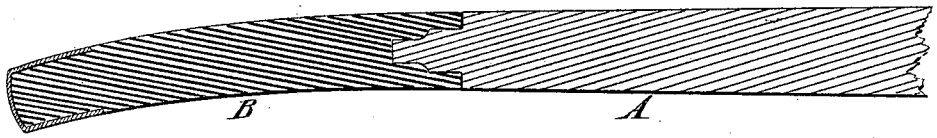

Be it known that I, NELSON MITCHELL, of Ellsworth Falls, Hancock county, Maine, have invented a new and useful Improvement in Carriage-Thills, of which the following is a specification:

Figure 1 represents a pair of thills to which my improvement has been applied; and Fig. 2 is a detail longitudinal section of one of the thills.

Similar letters of reference indicate corresponding parts.

The object of this invention is to improve the construction of carriage-thills, so as to prevent them from being broken should the horse accidentally step upon them, to prevent them from being broken should they be run against anything, and to prevent them from injuring another horse should they be run against him.

The invention consists of a carriage-thill provided with a rubber forward end, as hereinafter fully described.

A represents a thill, the forward end of which is made of rubber, as shown in Figs. 1 and 2. The rubber B is made of the same color, shape, and size as the ordinary wooden end would be, and when the thill is leathered the difference in material would not be noticed. The end of the rubber end B may have a metallic cap placed upon it, if desired. The rubber end B may also be applied to a thill that may have been accidentally broken, so as to avoid the expense of a new thill.

Having thus described my invention, I claim as new and desire to secure by Letters Patent—

A carriage-thill, A, provided with a rubber forward end, B, substantially as herein shown and described.

NELSON MITCHELL.

Witnesses:
CHARLES C. BURRILL,
J. E. PARSONS.